(12) United States Patent
Tsai et al.

(10) Patent No.: US 6,915,108 B2
(45) Date of Patent: Jul. 5, 2005

(54) SIGNAL TRANSCEIVER

(75) Inventors: Jason Tsai, Hsinchu (TW); Ian Hsieh, Hsinchu (TW)

(73) Assignee: Holteck Semiconductor Inc., Hsinchu (TW)

( * ) Notice: Subject to any disclaimer, the term of this patent is extended or adjusted under 35 U.S.C. 154(b) by 303 days.

(21) Appl. No.: 10/229,804

(22) Filed: Aug. 28, 2002

(65) Prior Publication Data

US 2003/0090366 A1 May 15, 2003

(30) Foreign Application Priority Data

Nov. 9, 2001 (TW) .................................... 90219363 U

(51) Int. Cl.[7] ............................................... H04B 5/00
(52) U.S. Cl. ....................... 455/41.1; 235/487; 340/10.1
(58) Field of Search ............................. 455/41.1–41.2, 455/73, 83; 340/10.1, 505; 235/487, 492

(56) References Cited

U.S. PATENT DOCUMENTS

| | | | |
|---|---|---|---|
| 4,814,595 A | * | 3/1989 | Gilboa ....................... 235/492 |
| 4,931,788 A | | 6/1990 | Creswick |
| 5,302,954 A | | 4/1994 | Brooks et al. |
| 5,541,604 A | | 7/1996 | Meier |
| 5,866,891 A | | 2/1999 | Fujimoto et al. |

* cited by examiner

Primary Examiner—Lee Nguyen
(74) Attorney, Agent, or Firm—Klein, O'Neill & Singh, LLP; Howard J. Klein

(57) ABSTRACT

A signal transceiver for transmitting a carrier signal to a transponder and receiving a modulated data signal returned by the transponder is provided. The signal transceiver includes a transistor with a base, a collector and an emitter, a controller being electrically connected to the base and providing a controlling signal for turning on the transistor, an oscillation source being electrically connected to the collector for providing the carrier signal, a capacitor being electrically connected to the base and the oscillation source for forming an oscillation circuit, and a resonator being electrically connected to the collector for transmitting the carrier signal to the transponder and receiving the modulated data signal returned by the transponder, and outputting a demodulated data signal through the emitter.

8 Claims, 5 Drawing Sheets

# SIGNAL TRANSCEIVER

FIELD OF THE INVENTION

This invention relates to a signal transceiver, and more particularly to a transceiver used for an interrogator with non-contact identification system.

BACKGROUND OF THE INVENTION

Please refer to FIG. 1 showing a circuit diagram of a signal transceiver according to the prior art. The base of a transistor $Q_1$ is electrically connected to an oscillator 12 which provides an oscillation frequency of 13.56 MHz. The base of the transistor $Q_1$ is also electrically connected to a voltage divider 11 which is composed of resistors $R_1$ and $R_2$ for providing a voltage $V_1$ to the base of the transistor $Q_1$ to turn on the transistor $Q_1$ at a correct working bias voltage. The collector of the transistor $Q_1$ is electrically connected to an inductance-capacitance resonant circuit 13. When the transistor $Q_1$ is turned on by the voltage divider 11, a carrier signal will be provided by the oscillator 12 to the transistor $Q_1$ and transmitted out through the resonant circuit 13. When a transponder 14 receives the carrier signal transmitted from the resonant circuit 13, it will immediately return a data signal being modulated by means of amplitude-shift keying (ASK). Subsequently, the resonant circuit 13 of the signal transceiver receives the modulated wireless signal from the transponder 14, and the collector of the transistor $Q_1$ generates a voltage variation. Since the voltage variation is weak and noisy, a rectifier 16 is used to rectify the voltage variation so as to eliminate the noise signal and generate a more stable and significant voltage variation. Finally, an envelope signal formed from the voltage variation is transmitted to an amplifier 17 to amplify the signal. Usually, a multi-stage amplification is executed to get better signals used for other circuit devices to determine the received data signals. In addition, a ferrite bead (FB) 15 connected between the resonant circuit 13 and the power supply is used to filter the noise signal.

As described above, for preventing distortion in signal transmitting process, quite a little hardware is set in the carrier signal transmitting and receiving circuits when designing a signal transceiver of an interrogator. Therefore, a lot of costs are consumed to overcome the distortion problem. Moreover, in the part of power system, a higher voltage, such as 9V, is used to provide a higher output power to enhance the signal. Therefore, how to reduce the supplying voltage for economizing energy is also an important subject.

SUMMARY OF THE INVENTION

It is an object of the present invention to provide a signal transceiver for transmitting a carrier signal and receiving the returned signal.

It is another object of the present invention to provide a signal transceiver with a simpler circuit framework to reduce the costs of unnecessary hardware.

It is an additional object of the present invention to provide a signal transceiver with lower supplying voltage.

In accordance with an aspect of the present invention, the signal transceiver for transmitting a carrier signal to a transponder and receiving a modulated data signal returned by the transponder includes a transistor with a base, a collector and an emitter, a controller being electrically connected to the base and providing a controlling signal for turning on the transistor, an oscillation source being electrically connected to the collector for providing the carrier signal, a capacitor being electrically connected to the base and the oscillation source for forming an oscillation circuit, and a resonator being electrically connected to the collector for transmitting the carrier signal to the transponder and receiving the modulated data signal returned by the transponder, and outputting a demodulated data signal through the emitter.

Preferably, the controller is a micro-controller.

Preferably, the controller is a voltage divider.

Preferably, the voltage divider is a series of resistors including at least two resistors.

Preferably, the oscillation source is a quartz oscillator.

Preferably, the resonator is an inductance-capacitance resonant circuit.

Preferably, the modulated data signal is modulated by amplitude-shift keying (ASK).

Preferably, the demodulated data signal is an envelope signal.

In accordance with another aspect of the present invention, the signal transceiver for transmitting a carrier signal to a transponder and receiving a modulated data signal returned by the transponder includes a transistor with a base, a collector and an emitter, a controller being electrically connected to the base and providing a controlling signal for turning on the transistor, an oscillator being electrically connected to the base for providing an oscillation frequency for the carrier signal, and a resonator being electrically connected to the collector for transmitting the carrier signal to the transponder and receiving the modulated data signal returned by the transponder, and outputting a demodulated data signal through the emitter.

Preferably, the controller is a micro-controller.

Preferably, the controller is a voltage divider.

Preferably, the voltage divider is a series of resistors including at least two resistors.

Preferably, the resonator is an inductance-capacitance resonant circuit.

Preferably, the modulated data signal is modulated by amplitude-shift keying (ASK).

Preferably, the demodulated data signal is an envelope signal.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

Figure 1:
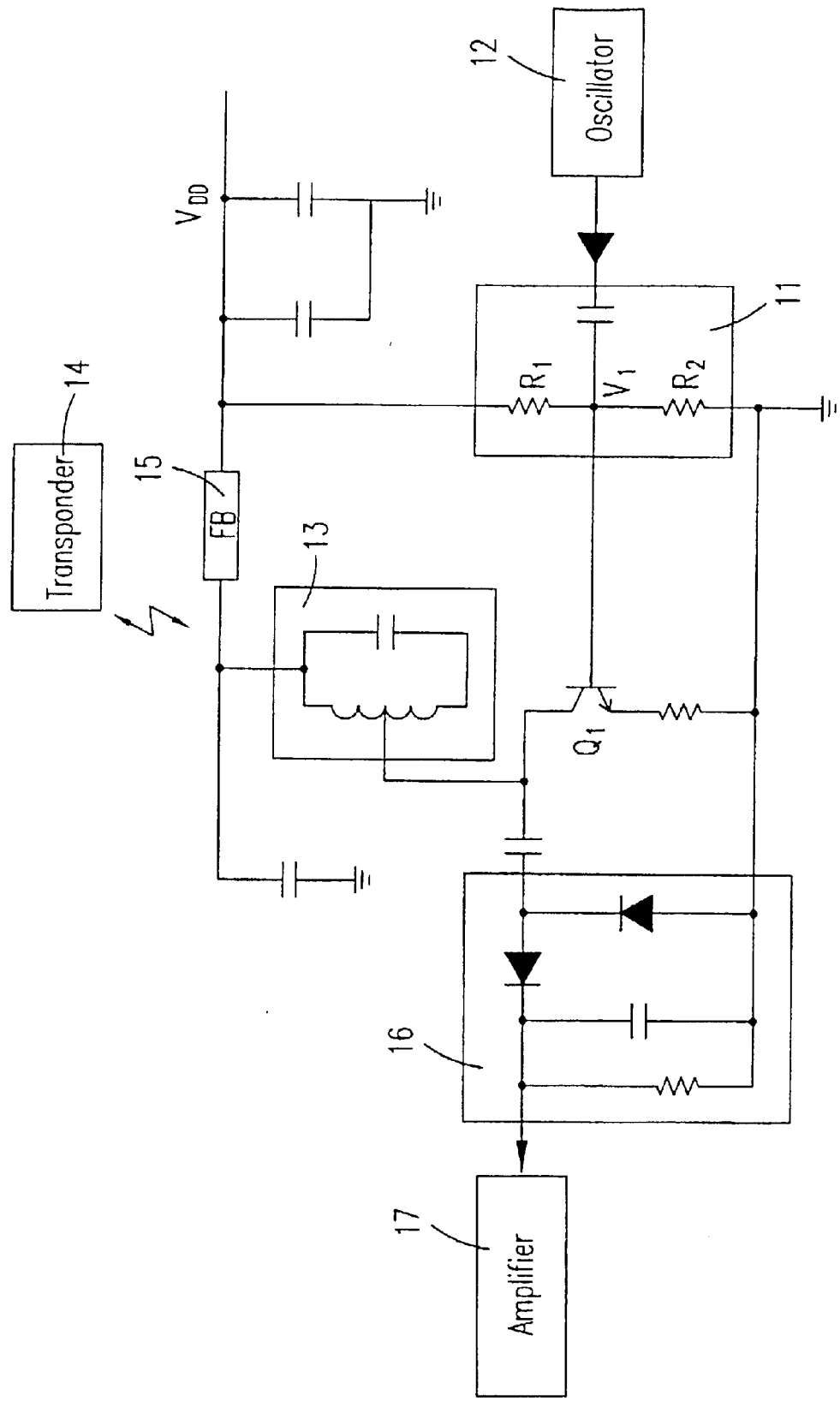
FIG. 1 shows the circuit diagram of the signal transceiver according to the prior art.
Figure 2:
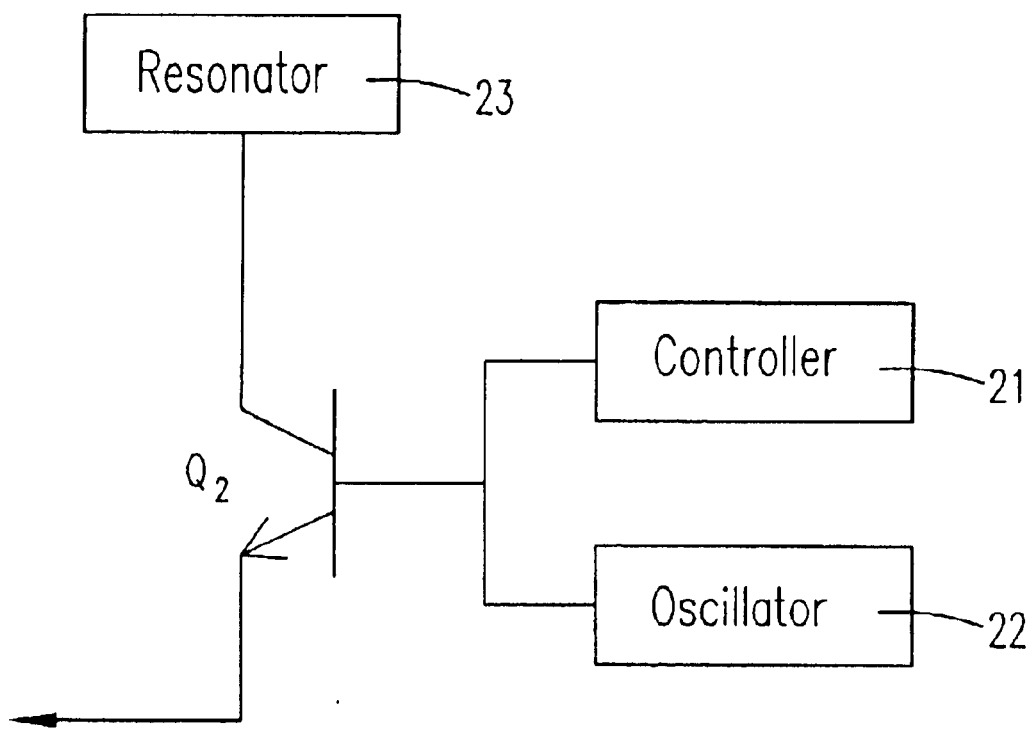
FIG. 2 shows the block diagram of the transceiver of the interrogator according to the preferred embodiment of the present invention.
Figure 3:
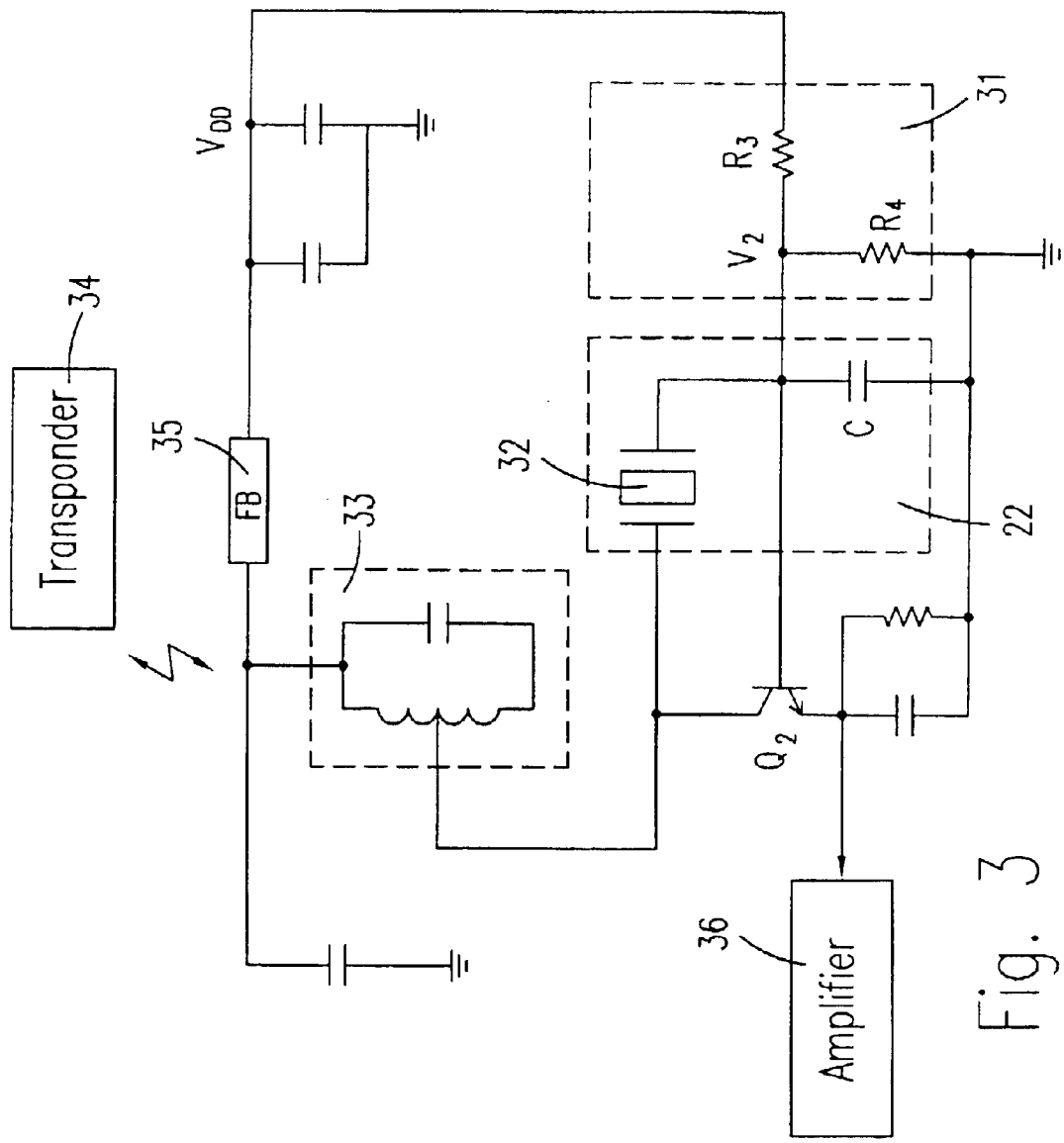
FIG. 3 shows the transceiving circuit diagram of the interrogator according to the preferred embodiment of the present invention.

Please refer to FIG. 2 showing the block diagram of the transceiver of the interrogator, which is used for transmitting a carrier signal to a transponder 34 (as shown in FIG. 3), and receiving a modulated data signal returned by the transponder 34 according to the preferred embodiment of the present invention. The transceiver includes a transistor $Q_2$ with a base, a collector and an emitter, a controller 21 being electrically connected to the base, an oscillator 22 being electrically connected to the collector and the base, and a resonator 23 being electrically connected to the collector.

Please simultaneously refer to FIG. 3 showing the transceiving circuit diagram of the interrogator according to the preferred embodiment of the present invention. The same element numeral in FIG. 2 and FIG. 3 means the same element. The controller 21 can be a voltage divider 31 formed of a series of resistors including $R_3$ and $R_4$ for providing a voltage $V_2$ to the base of the transistor $Q_2$. The oscillator 22 includes an oscillation source and a capacitor C (about 39P farad), and the oscillation source is a quartz oscillator 32 (the oscillation frequency is about 13.56 MHz). The quartz oscillator 32 is electrically connected to the collector of the transistor $Q_2$ for providing a carrier signal. The capacitor C is electrically connected to the base of the transistor $Q_2$ and the quartz oscillator 32 for forming an oscillation circuit. The resonator 23 is formed of an inductance-capacitance resonant circuit 33. In addition, the series of resistors for providing the voltage can be other external circuit. For example, a micro-controller can be used to turn on the transistor $Q_2$. The micro-controller is directly and electrically connected to the base of the transistor $Q_2$ and outputs a proper voltage to the transistor $Q_2$.

Figure 4A:
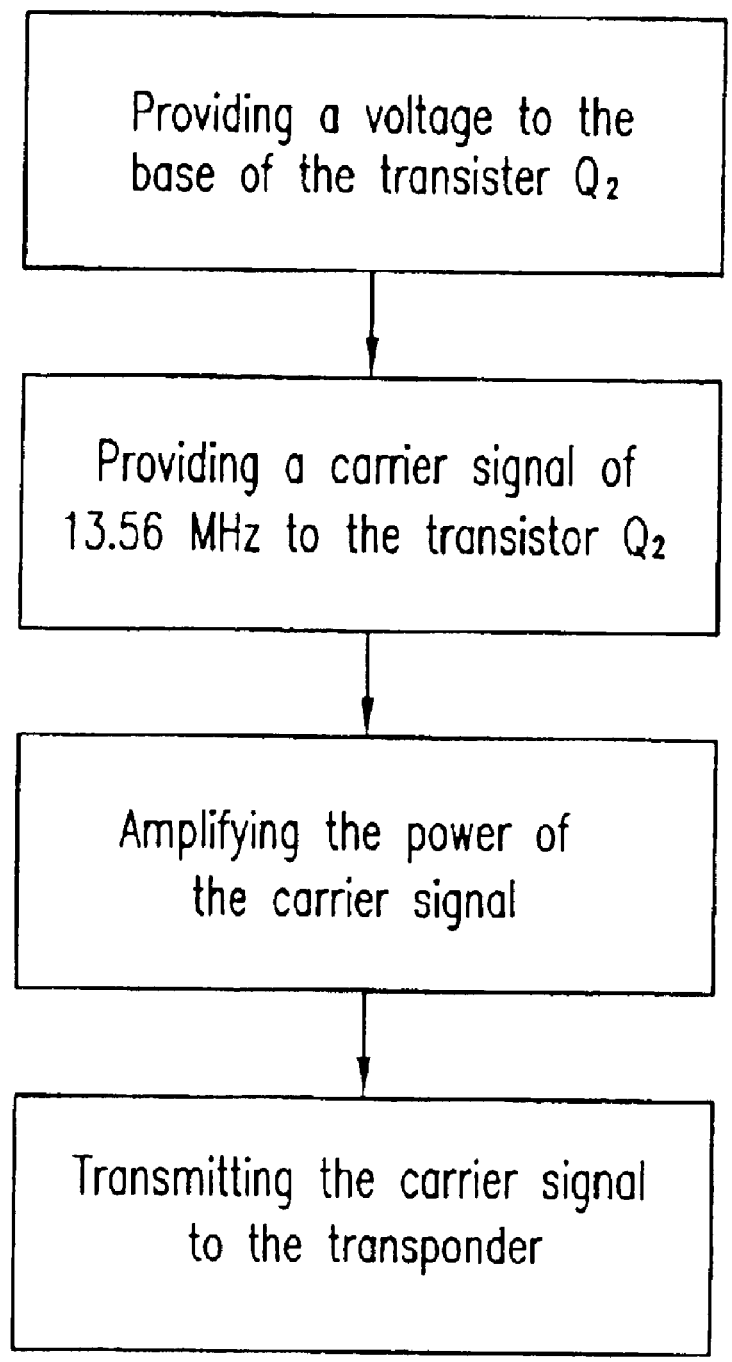
FIG. 4(a) shows the flowchart of signal transmitting according to the preferred embodiment of the present invention.
Figure 4B:
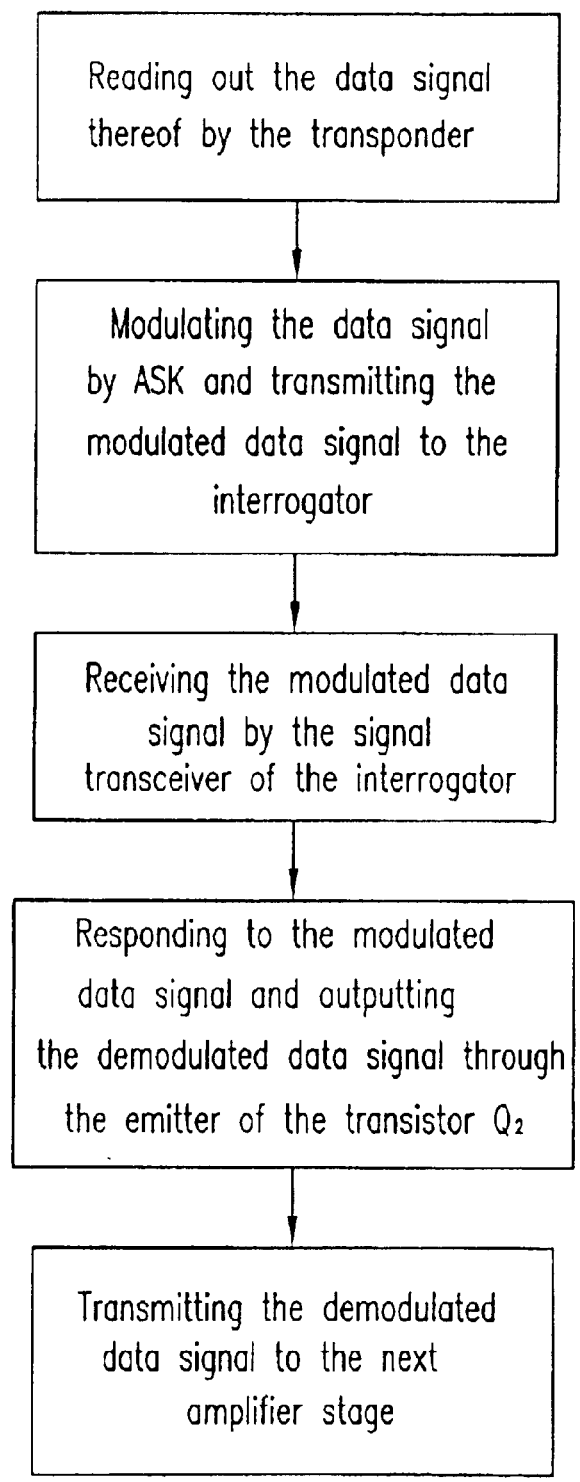
FIG. 4(b) shows the flowchart of data receiving according to the preferred embodiment of the present invention.

For more clearly defining the patent characteristics of the present invention, the circuit actions of the power transmitting and the data receiving are described in two parts as follows, and please simultaneously refer to FIGS. 4(*a*) and 4(*b*) showing the flowcharts of the present invention.

1. Power Transmitting (FIG. 4(*a*)):

A voltage $V_2$ is provided by the series of resistors $R_3$ and $R_4$ to the base of the transistor $Q_2$ for establishing the working voltage or turn-on potential to turn on the transistor $Q_2$. When the transistor $Q_2$ is turned on, the oscillator 22 provides an oscillation frequency of 13.56 MHz, which is amplified through the transistor $Q_2$ and becomes a carrier signal. Then the carrier signal is transmitted out through the resonant circuit 33 and power is transmitted to an external transponder 34.

2. Data Receiving (FIG. 4(*b*)):

When the transponder 34 receives the carrier signal transmitted from the signal transceiver of the interrogator, it will read out the data signal thereof immediately, and modulate the data signal by means of amplitude-shift keying (ASK). Subsequently, the modulated data signal is transmitted back to the signal transceiver of the interrogator through the resonant circuit or antenna of the transponder 34. When the resonant circuit 33 of the signal transceiver of the interrogator receives the modulated data signal transmitted from the transponder 34, the collector of the transistor $Q_2$ will respond to the modulated data signal, and the emitter of the transistor $Q_2$ can generate a current/voltage variation. In the circuit framework of the present invention, the emitter can provide a more significant voltage signal variation. Therefore, an advantage of the present invention is that the voltage variation of the emitter is measured, and the envelope signal measured from the voltage variation is transmitted to the next amplifier stage 36 and restores the received data signal.

Another advantage of the present invention is that the oscillation frequency is generated by an independent hardware equipment in the prior art, while in the present invention, only an element, i.e. a quartz oscillator 32 with an oscillation frequency of 13.56 MHz supplementing with the capacitor C and accompanying with the transistor $Q_2$, needs to be added and can result in the same oscillation effect.

An additional advantage of the present invention is that the envelope signal is directly outputted through the emitter of the transistor. Since the voltage variation generated in the emitter is quite significant, the output envelope signal is also significant so that it doesn't need to be rectified. In addition, because the output signal is strong enough, the design of the next amplifier stage can be simplified. Therefore, the present invention uses fewer hardware circuits to amplify the signal to the required level.

In conclusion, the present invention provides the transceiving functions of the conventional interrogator with a simpler circuit framework, which reduces the costs of unnecessary hardware and the system voltage can be decreased to below 4.5V. Therefore, the present invention meets with the requirements of the industrial circles and has particle and developing values.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A signal transceiver for transmitting a carrier signal to a transponder and receiving a modulated data signal returned by said transponder, comprising:

a transistor with a base, a collector and an emitter;

a controller being electrically connected to said base and providing a controlling signal for turning on said transistor;

an oscillation source being electrically connected to said collector for providing said carrier signal;

a capacitor being electrically connected to said base and said oscillation source for forming an oscillation circuit; and a resonator being electrically connected to said collector for transmitting said carrier signal to said transponder and receiving said modulated data signal returned by said transponder, and outputting a demodulated data signal through said emitter.

2. The signal transceiver according to claim 1 wherein said controller is a micro-controller.

3. The signal transceiver according to claim 1 wherein said controller is a voltage divider.

4. The signal transceiver according to claim 3 wherein said voltage divider is a series of resistors including at least two resistors.

5. The signal transceiver according to claim 1 wherein said oscillation source is a quartz oscillator.

6. The signal transceiver according to claim 1 wherein said resonator is an inductance-capacitance resonant circuit.

7. The signal transceiver according to claim 1 wherein said modulated data signal is modulated by amplitude-shift keying (ASK).

8. The signal transceiver according to claim 1 wherein said demodulated data signal is an envelope signal.

* * * * *